United States Patent
Huang

(10) Patent No.: US 8,137,012 B2
(45) Date of Patent: Mar. 20, 2012

(54) CAMERA SHUTTER

(75) Inventor: Tien-Chung Huang, Chang Hwa (TW)

(73) Assignee: Tricore Corporation, Chang Hwa (TW)

( * ) Notice: Subject to any disclaimer, the term of this patent is extended or adjusted under 35 U.S.C. 154(b) by 95 days.

(21) Appl. No.: 12/801,516

(22) Filed: Jun. 11, 2010

(65) Prior Publication Data

US 2011/0069949 A1 Mar. 24, 2011

(30) Foreign Application Priority Data

Sep. 18, 2009 (JP) .................................. 2009-217516

(51) Int. Cl.
*G03B 9/08* (2006.01)

(52) U.S. Cl. ....................................................... 396/463

(58) Field of Classification Search .......... 396/449–452, 396/463, 464, 468
See application file for complete search history.

(56) References Cited

U.S. PATENT DOCUMENTS

| 4,531,820 A * | 7/1985 | Petersen ........................ 396/464 |
| 4,558,937 A * | 12/1985 | Petersen et al. ............... 396/464 |
| 2011/0069948 A1 * | 3/2011 | Huang ........................... 396/463 |
| 2011/0069949 A1 * | 3/2011 | Huang ........................... 396/468 |

FOREIGN PATENT DOCUMENTS

JP 2001-281724 10/2001

* cited by examiner

*Primary Examiner* — W. B. Perkey
(74) *Attorney, Agent, or Firm* — McGinn IP Law Group, PLLC

(57) ABSTRACT

A camera shutter comprising a shutter driving means which has permanent magnets on both ends of a swingably journaled swinging lever and drives a shutter blade by conduction of electricity to a magnet coil wound around an iron core that is fixed so as to face the permanent magnets, thereby performing efficient motion. A camera shutter comprises a base plate having a shutter opening; a shutter blade for opening and closing the shutter opening; and a driving means for driving the shutter blade, wherein the driving means comprises a swingably journaled swinging lever having arm portions on both sides of a rotating shaft as well as a portion connected to the shutter blade, permanent magnets provided on both ends of the arm portions, a magnet coil wound around an iron core that is fixed so as to face the permanent magnets of the both ends, and an electromagnetic drive circuit for controlling electricity conduction to the magnet coil; and the swinging lever is operated by attractive force toward or repelling force against the permanent magnet that is generated by conduction of electricity to the magnet coil to drive the shutter blade.

3 Claims, 6 Drawing Sheets

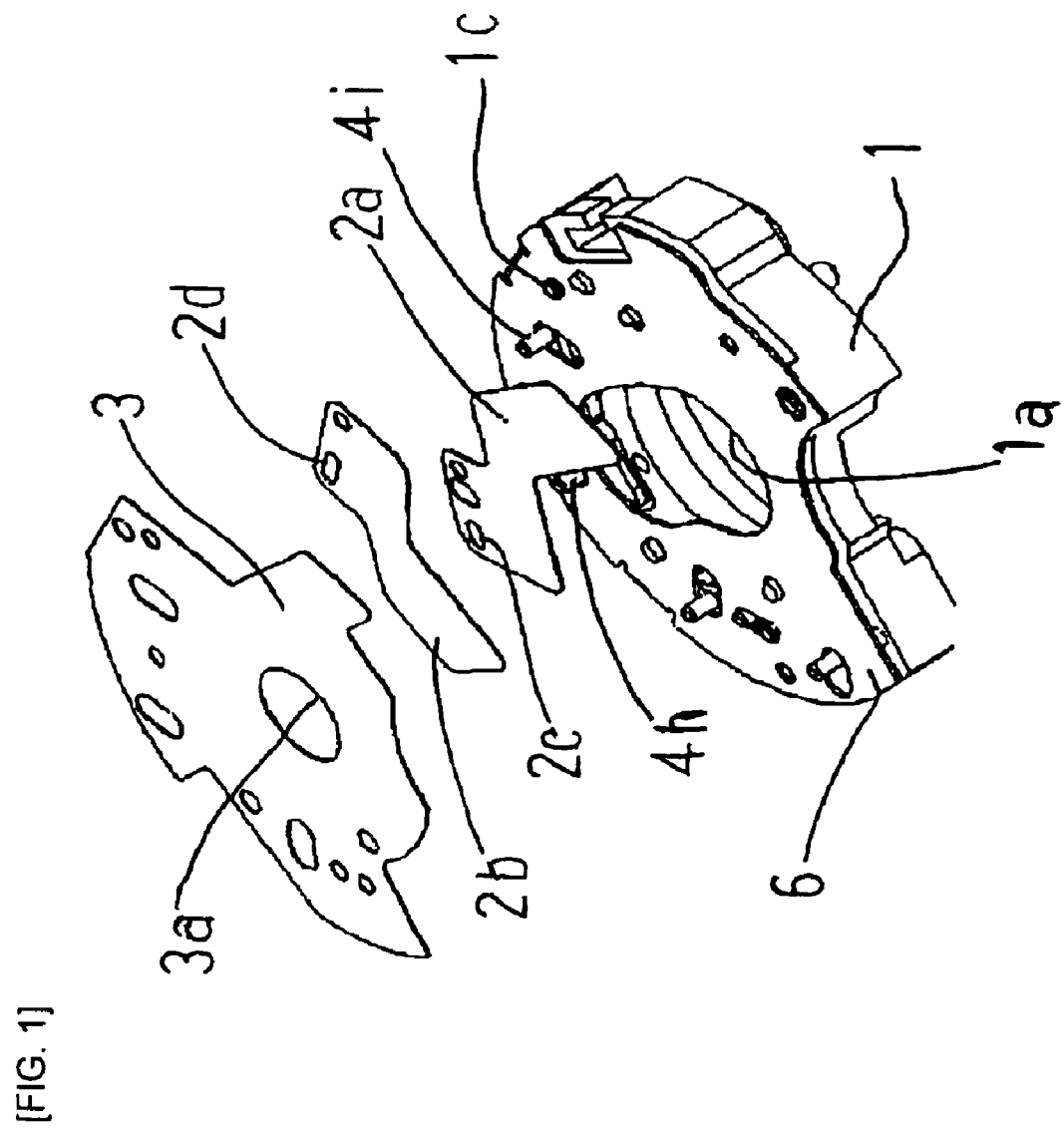
[FIG. 1]

[FIG.2]
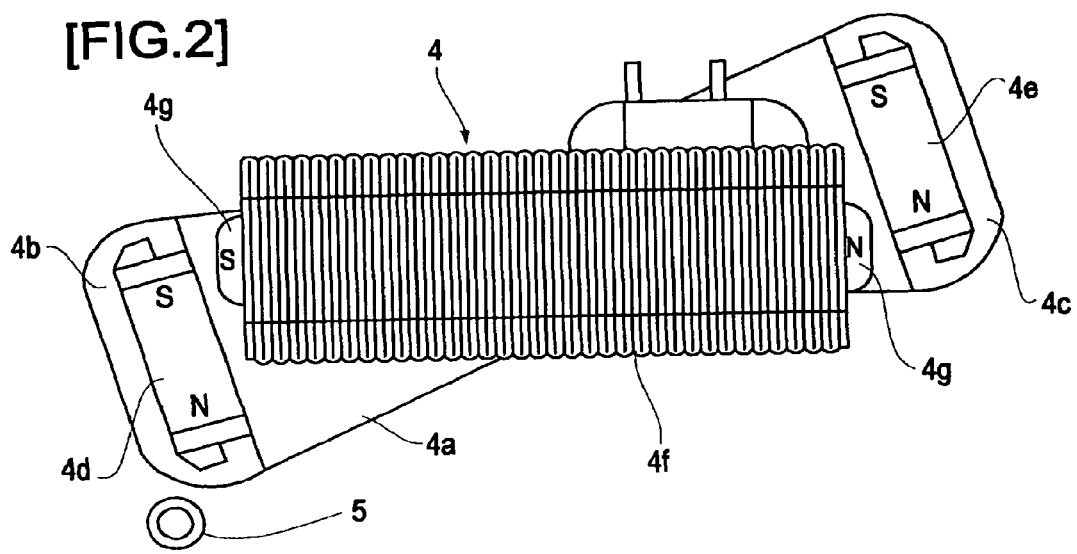
[FIG.3]
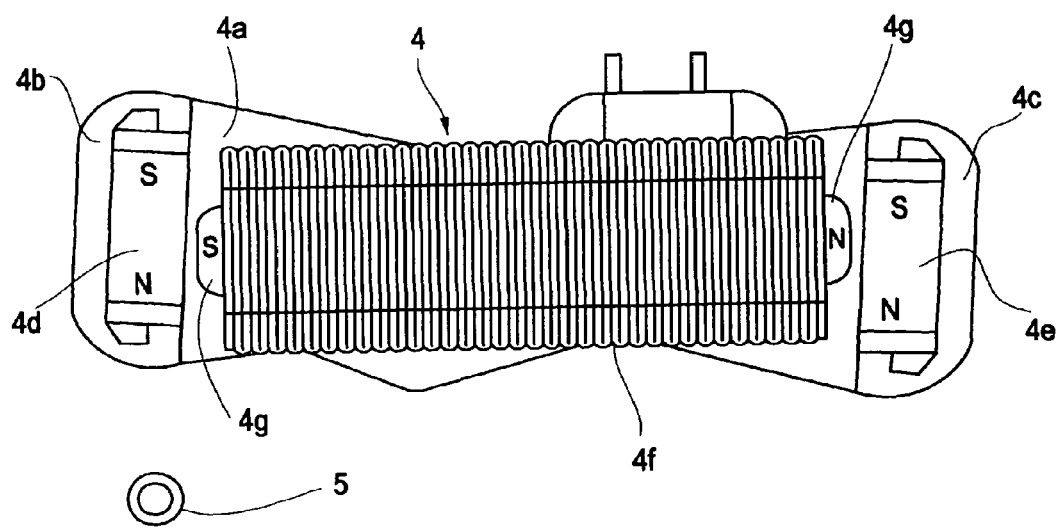

[FIG.4]
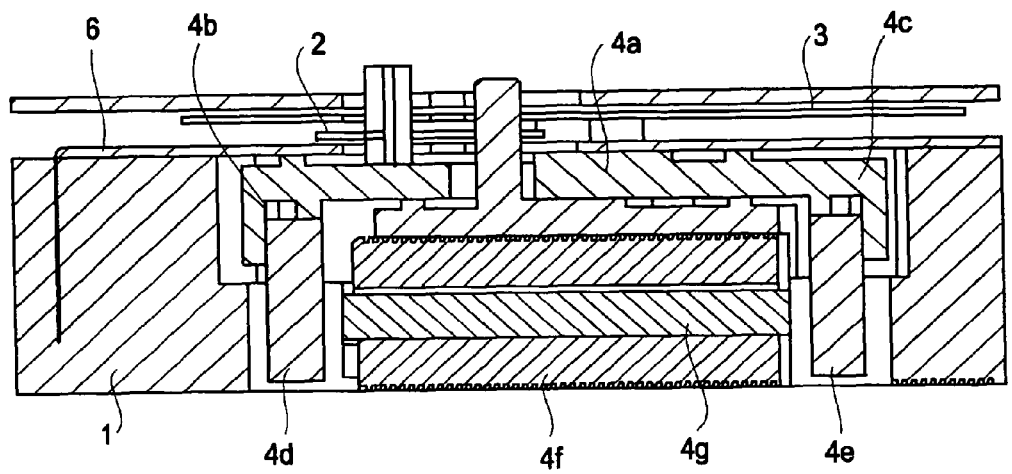
[FIG.5]
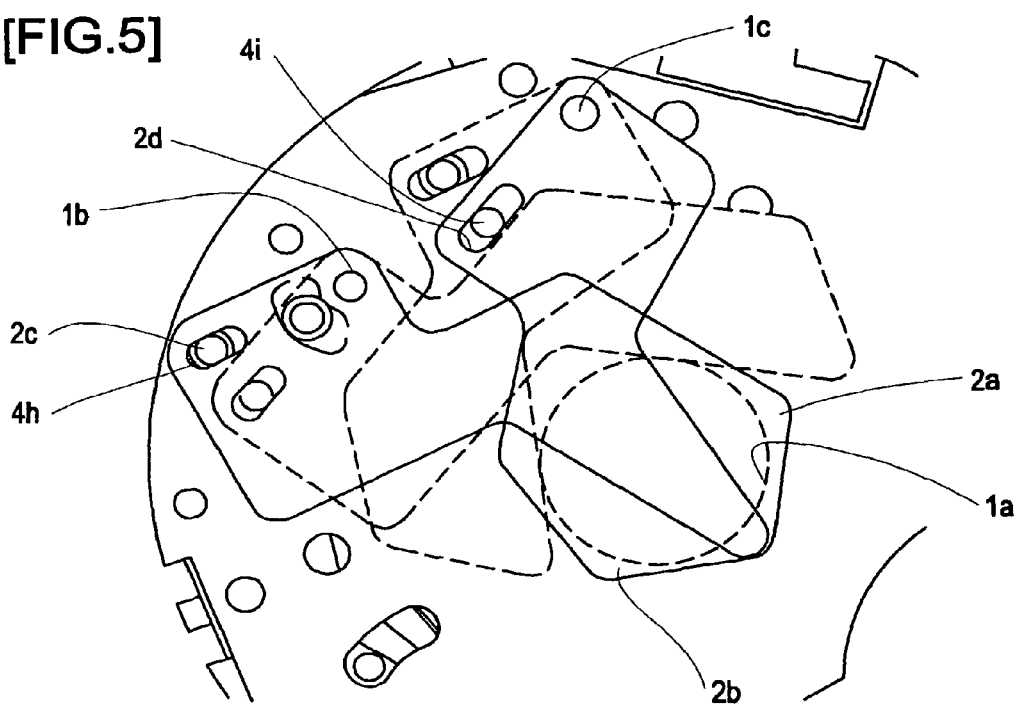

[FIG.6]
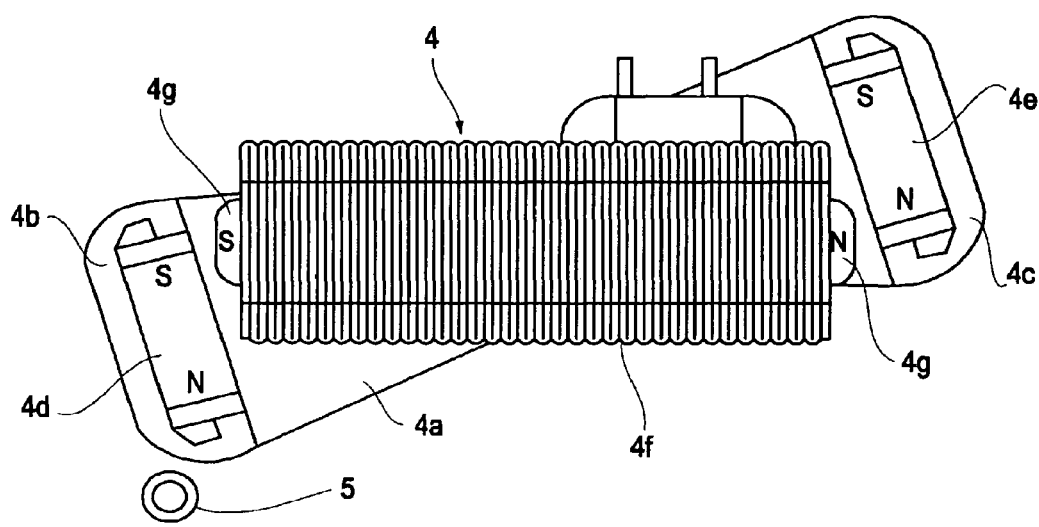

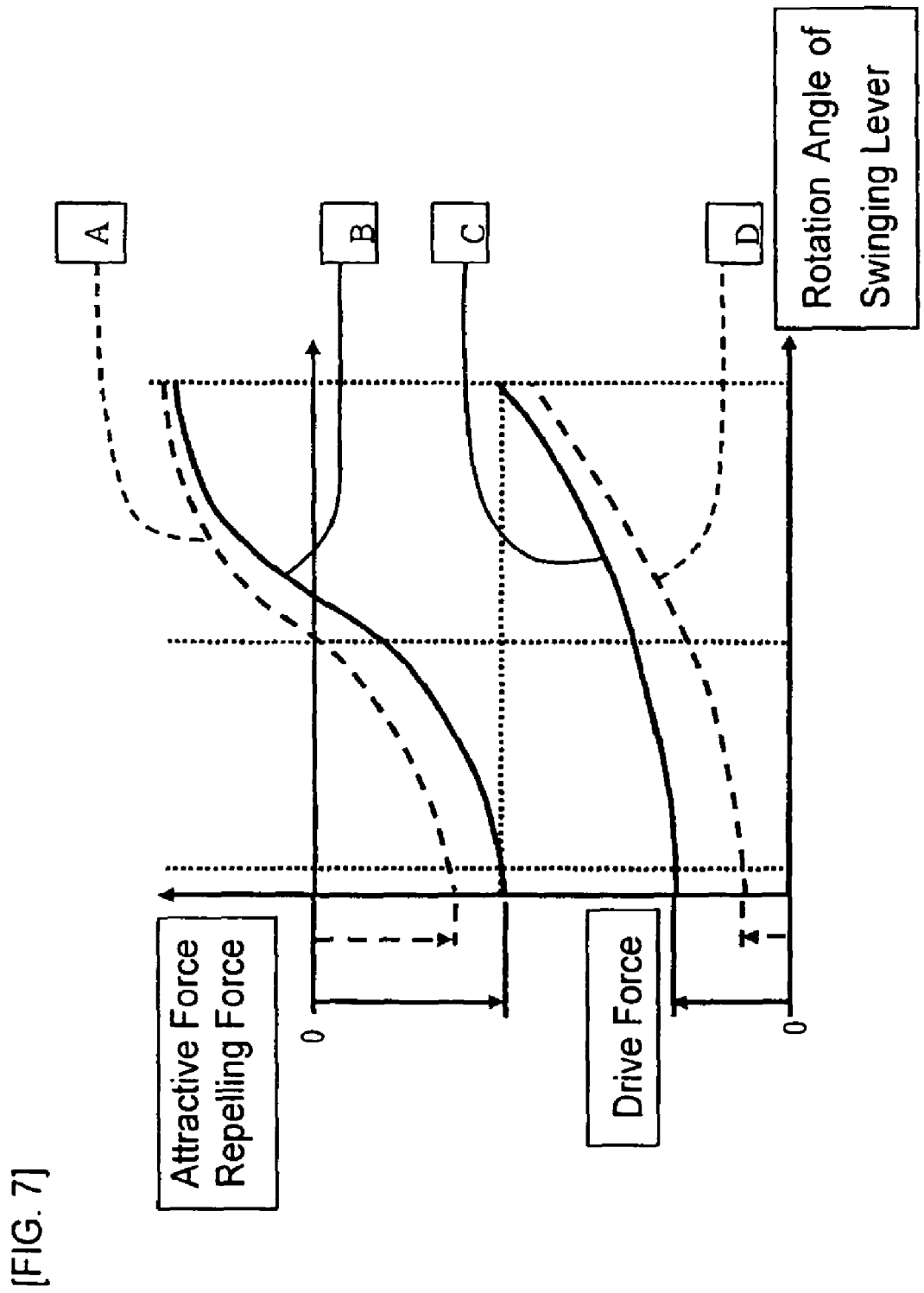
[FIG. 7]

[FIG.8]
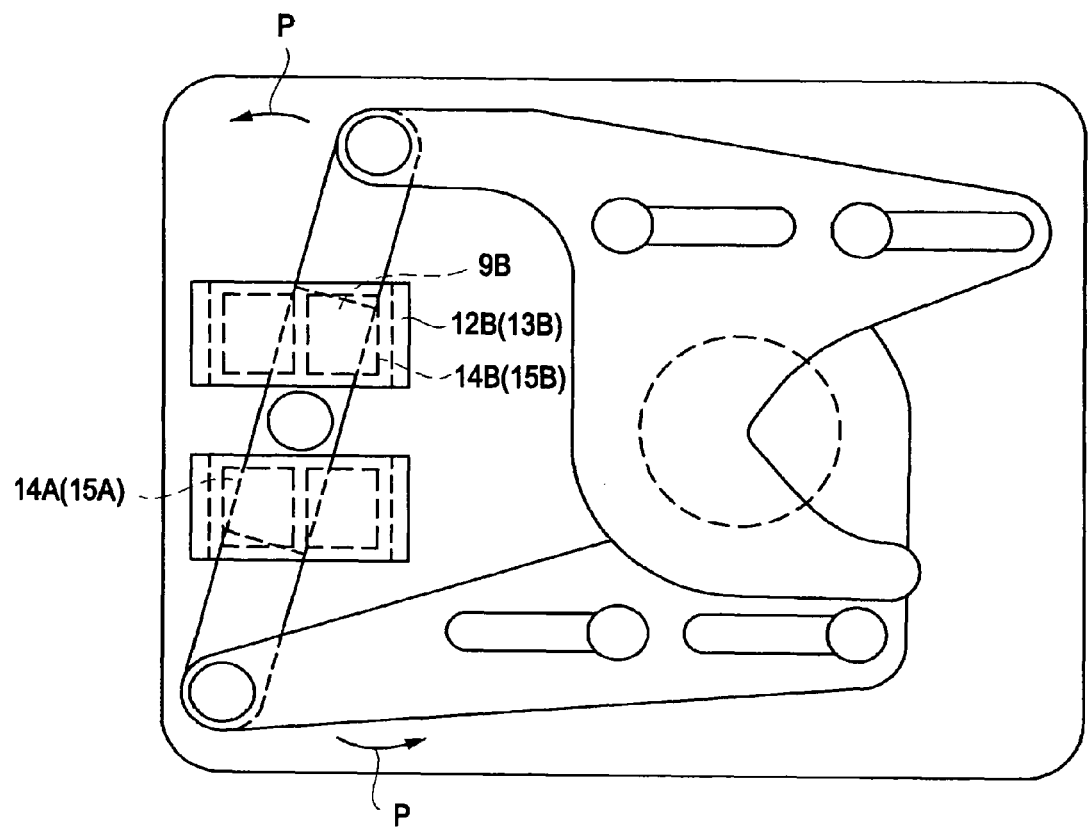

CAMERA SHUTTER

The present application is based on Japanese Patent Application No. 2009-217516 filed on Sep. 18, 2009, the entire contents of which are incorporated herein by reference.

BACKGROUND OF THE INVENTION

1. Field of the Invention

The invention relates to a camera shutter provided with a shutter blade for opening and closing a shutter opening provided on a base plate.

2. Description of the Related Art

A conventional camera shutter such as described in, e.g., JP-A 2001-281724 is known (see FIG. 8). An electromagnetic drive shutter described in JP-A 2001-281724 has a driving means for operating a shutter blade but two coils corresponding to two permanent magnets mounted on a driving lever are required in order to drive the driving lever.

In other words, the driving lever starts an operation to open the shutter when an operating current is conducted to two magnetic drive coils at a closing position of the shutter blade, and sequentially, the driving lever starts an operation to close the shutter when the operating current in a reverse direction is conducted to the two magnetic drive coils at an opening position.

In addition, a shutter in a form to operate a shutter blade by rotating a permanent magnet rotor arranged inside a coil by conduction of electricity to one coil is known as a second method.

However, the above-mentioned conventional art requires two coils corresponding to two permanent magnets, and further, a control circuit for conducting electricity to the coils and a component composing a connecting portion to the coils are complicated. In addition, since this coil is a so-called air-cored coil, magnetic flux leakage caused by the conduction of electricity to the coil is likely to occur, compared with the case of having an iron coil. Therefore, energy of the electricity conduction is not effectively used for a shutter operation and the loss thereof is relatively large.

In addition, since obtained power is transmitted by rotating a small rotor arranged inside a coil, the above-mentioned second method has a problem that the obtained power is small and large energy is lost in a transfer pathway.

SUMMARY OF THE INVENTION

It is an object of the invention to provide a low-cost camera shutter which solves the above-mentioned problems and is configured such that the structure is simple with less magnetic flux leakage and powerful drive force is generated proportional to an amount of electricity conduction to a coil in order to perform stable movement.

To achieve the above-mentioned object, a camera shutter according to the present invention comprises a base plate having a shutter opening, a shutter blade for opening and closing the shutter opening and a driving means for driving the shutter blade, wherein the driving means comprises a swingably journaled swinging lever having arm portions on both sides of a rotating shaft as well as a portion connected to the shutter blade, permanent magnets provided on both sides of the arm portions, a magnet coil wound around an iron core that is fixed so as to face the permanent magnets of the both ends, and an electromagnetic drive circuit for controlling electricity conduction to the magnet coil, and the swinging lever is operated by attractive force toward or repelling force against the permanent magnet that is generated by conduction of electricity to the magnet coil to drive the shutter blade.

According to the invention, a camera shutter comprises a base plate having a shutter opening, a shutter blade for opening and closing the shutter opening and a driving means for driving the shutter blade, wherein the driving means comprises a swingably journaled swinging lever having arm portions on both sides of a rotating shaft as well as a portion connected to the shutter blade, permanent magnets provided on both sides of the arm portions, a magnet coil wound around an iron core that is fixed so as to face the permanent magnets of the both ends and an electromagnetic drive circuit for controlling electricity conduction to the magnet coil, and the swinging lever is operated by attractive force toward or repelling force against the permanent magnet that is generated by conduction of electricity to the magnet coil to drive the shutter blade, hence, it is to operate the permanent magnets provided on the both ends of the arm portions located at a large radius portion and it is possible to provide a cheap and preferable shutter with a stable operation.

In addition, according to the invention described claim 2, since the magnet coil is configured to be wound around the iron core which is fixed so as to face inner sides of the permanent magnets of the ends of the both arm portions, the powerful drive force is obtained in spite of a simple structure and it is possible to provide a camera shutter with a good operation.

Furthermore, according to the invention described claim 3, since it is configured such that the swinging lever is operated to drive the shutter blade while the permanent magnet is moved in a direction along a surface of the iron core, it is possible to provide a shutter which is efficient without wasting the drive force.

BRIEF DESCRIPTION OF THE DRAWINGS

Next, the present invention will be explained in more detail in conjunction with appended drawings, wherein:

FIG. 1 is a perspective view showing a configuration of a shutter blade in an embodiment of the present invention;

FIG. 2 is a plan view showing an enlarged main portion in the embodiment of the invention when the shutter is closed;

FIG. 3 is a plan view showing an enlarged main portion in the embodiment of the invention when the shutter is open;

FIG. 4 is a cross sectional view showing an enlarged main portion in the embodiment of the invention;

FIG. 5 is an enlarged plan view showing a shutter blade operating portion in the embodiment of the invention;

FIG. 6 is a plan view showing an enlarged main portion in a second embodiment of the invention when the shutter is closed;

FIG. 7 is an operation explanatory view showing the shutter blade in the embodiment of the invention; and FIG. 8 is an explanatory view showing a configuration of a conventional shutter.

DETAILED DESCRIPTION OF THE PREFERRED EMBODIMENTS

A preferred embodiment of a camera shutter according to the present invention will be described below in conjunction with the drawings.

At first, the embodiment of the camera shutter according to the invention will be described referring to FIGS. 1 to 5. A camera shutter shown in FIG. 1 shows an embodiment of a lens shutter. The lens shutter has a base plate 1 provided with a circular shutter opening 1a. On the base plate 1, a pair of shutter blades 2a and 2b for opening and closing the shutter opening 1a is pivotally mounted around supporting shafts 1b and 1c. An oval operating groove 2c is formed on the shutter blade 2a and an oval operating groove 2d is formed on the shutter blade 2b.

In addition, a cover plate 3 is mounted above the base plate 1 while securing an operating space for the shutter blades 2a and 2b. An opening 3a of which center coincides with that of the shutter opening 1a of the base plate 1 is formed on the cover plate 3. Moreover, a driving means 4 for operating opening and closing of the shutter blades 2a and 2b is arranged on a left side of the shutter opening 1a of the base plate 1 in a state shown in FIG 2.

As shown in FIGS. 1 and 2, the driving means 4 has a swinging lever 4a formed of synthetic resin and the swinging lever 4a is pivotally mounted to the supporting shaft 1b which is provided on the base plate 1. The swinging lever 4a has arms 4b and 4c extending toward both sides of the supporting shaft 1b, and permanent magnets 4d and 4e are fixed and attached to respective tip portions of the arms 4b and 4c.

In addition, an iron core 4g having a drive coil 4f wound therearound is fixed on the base plate 1 so as to face the permanent magnets 4d and 4e which are fixed to tip portions of the arms 4b and 4c of the swinging lever 4a. Then, the iron core 4g is arranged so as to face the permanent magnets 4d and 4e at a close distance. As shown in FIG. 2, the permanent magnets 4d and 4e are arranged on both sides of the iron core 4g, and are magnetized so that north and south poles face each other in a direction along the surface of the iron core 4g.

A restraining member 5 made of magnetic material is arranged in the vicinity of the south pole of the permanent magnet 4d so as to correspond to a position where the swinging lever 4a stops in the state shown in FIG. 2 which shows a shutter closing position. The restraining member 5 is for stopping the shutter blades 2a and 2b without fail at the closing position and for the stable operation of the shutter blades 2a and 2b.

The permanent magnets 4d and 4e are configured to move in a direction along both edge surfaces of the iron core 4g having the drive coil 4f wound therearound. In this case, it is preferable that, as shown in FIG. 6, the both edge surfaces of the iron core 4g arc formed in a circular arc shape centering the supporting shaft 1b of the swinging lever 4a and the facing surfaces of the permanent magnets 4d and 4e which face the edge surfaces of the iron core 4g are also formed in a circular arc shape so as to be along the edge surfaces of the iron core 4g.

On the other hand, it is configured that the control current is conducted to the drive coil 4f from a non-illustrated electronic control circuit in a forward and reverse direction for a predetermined time period to sequentially generate the north and south poles at both ends of the iron core 4g by excitation thereof.

Meanwhile, projections 4h and 4i are formed on the arms 4b and 4c of the swinging lever 4a, and the projections 4h and 4i are respectively engaged with the oval operating grooves 2c and 2d formed on the shutter blades 2a and 2b in order to operate the shutter blades 2a and 2b, thereby opening and closing the shutter opening 1a.

Although other components for shutter control are arranged on the base plate 1, there is no direct relation with the operation of the camera shutter, and thus, only a partial illustration is shown and the entire illustration and explanation are omitted so that the main portion of the camera shutter is easily understood. A thin partition plate 6 is arranged so as to cover the operation region so that the components for the shutter control, including the driving means 4, arranged on the base plate 1 do not disturb the operation of the shutter blades 2a and 2b.

A method of operating the camera shutter configured as described above will be described in detail below. When the control current is conducted to the drive coil 4f from the non-illustrated electronic control circuit for a predetermined time period in accordance with a release operation for taking a photograph, the iron core 4g is magnetized by the drive coil 4f and the drive force in a direction against the magnetic force of the permanent magnets 4d and 4e is generated at the both ends of the iron core 4g.

In other words, when the control current is conducted to the drive coil 4f for a predetermined time period in the state shown in FIG. 2, the iron core 4g is magnetized by the drive coil 4f to generate the north pole on the right side and the south pole on the left side, thus, the drive force in a direction against the magnetic force of the permanent magnets 4d and 4e is generated, and depending on the drive force, the swinging lever 4a swings clockwise around the supporting shaft 1b by reaction force of the permanent magnets 4d and 4e from the state shown in FIG. 2 to the state shown in FIG. 3.

In the last half of the operation, the swinging lever 4a continues to swing clockwise around the supporting shaft 1b as the permanent magnets 4d and 4e are attracted toward the iron core 4g by the attractive force. In accordance with the operation of the swinging lever 4a, the projections 4h and 4i move in the oval operating grooves 2c and 2d to swing the shutter blades 2a and 2b from the state indicated by a solid line to the state indicated by a dashed line in FIG. 5 and the shutter opening 1a is moved in an opening direction, thereby completely opening the shutter opening 1a.

Following this, once the desired exposure time of the shutter has elapsed, the control current for closing the shutter blades 2a and 2b is conducted from the non-illustrate electronic control circuit to the drive coil 4f for the predetermined time period, the both ends of the iron core 4g are magnetized by the drive coil 4f to be a magnetic pole opposite to the above-mentioned case, the drive force in a direction against the magnetic force of the permanent magnets 4d and 4e is generated, and the swinging lever 4a then swings counterclockwise from the state shown in FIG. 3 to operate the shutter blades 2a and 2b in a closing direction. In other words, the both ends of the iron core 4g are magnetized to be a magnetic pole opposite to FIG. 3, and depending on this drive force, the swinging lever 4a swings counterclockwise the supporting shaft 1b by reaction force of the permanent magnets 4d and 4e at the both ends, returns to the state shown in FIG. 2 from the state shown in FIG. 3, and operates the shutter blades 2a and 2b in a direction for closing the shutter opening 1a.

As described above, since the shutter blade is driven by operating the swinging lever 4a by the attractive force toward or the repelling force against the permanent magnets 4d and 4e which is generated by conduction of electricity to the drive coil 4f, the permanent magnets 4d and 4e provided at the ends of the both arm portions 4b and 4c located at a large radius portion are operated, and it is thereby possible to provide a cheap and preferable shutter with a stable operation. In other words, since large drive force is obtained compared with the case of rotating a small permanent magnet rotor arranged inside the coil, it is possible to ensure the stable operation.

The operation of the drive force with respect to an operational rotation angle of the swinging lever 4a and repelling force as well as attractive force of the permanent magnets 4d and 4e will be described below referring to FIG. 7. All lines show a relation between drive force F with respect to an operational angle (vertical axis) of the swinging lever 4a and the repelling force as well as the attractive force of the permanent magnets 4d and 4e against and toward the restraining member 5. Each of the lines will be explained below.

In FIG. 7, the line a shows a repelling/attractive force curve without presence of the restraining member 5, in which the negative side with respect to the zero level indicates the repelling force and the positive side indicates the attractive force. In other words, when the swinging lever 4a is rotated by the conduction of electricity to the coil, the repelling force gradually decreases since the restraining member 5 does not exist, and after reaching the zero level, the swinging lever 4a is operated to the stop position depending on the attractive force toward the opposite magnetic pole.

The line B shows a repelling/attractive force curve with presence of the restraining member 5. When the swinging lever 4a is rotated by the conduction of electricity to the coil, since the restraining member 5 exists, the repelling force stays still without decreasing for a certain time period and then starts decreasing, and when the swinging lever 4a is gradually rotated and approaches to the end position of the operation, the swinging lever 4a is attracted toward the stop position depending on the attractive force toward the opposite magnetic pole.

The line C shows a driving force curve with presence of the restraining member 5 and it is shown that, since the restraining member 5 exists, the drive force is large from the initial stage of the rotation of the swinging lever 4a by the conduction of electricity to the coil and does not increase for a predetermined time period in order to escape from the attractive force of the restraining member 5. After that, the drive force gradually increases, and when the swinging lever 4a is rotated and approaches to the end position of the operation, the attractive force toward the opposite magnetic pole is added and the swinging lever 4a is attracted toward the stop position.

The line D shows a driving force curve without presence of the restraining member 5. When the swinging lever 4a is rotated by the conduction of electricity to the coil, the drive force gradually increases although the force is small since the restraining member 5 does not exist, and the swinging lever 4a is operated to the stop position depending on the attractive force toward the opposite magnetic pole with continuous gradual acceleration.

Although the embodiment of the camera shutter according to the invention has been described above, the invention is, needless to say, not limited to the above-mentioned embodiment. For example, although the camera shutter in the above embodiment is a two-bladed rotary lens shutter, it is applicable to the camera shutter using three or more blades, a sliding blade or other forms of blade.

In addition, although a magnetizing direction of the permanent magnet is polarized north-south in a rotation direction of the swinging lever 4a in the above-mentioned embodiment of FIGS. 2, 3, 4 and 6, it is possible to operate by a configuration in which the iron core 4g side and the opposite side are magnetized to be north and south. Furthermore, although the swinging lever 4a and the iron core 4g are fixed on the base plate 1 in the above-mentioned embodiment, it is apparently possible to fix on other members as long as on a fixing member.

In addition, if the magnetic pole of the permanent magnet in the above description is configured as a reverse magnetic pole, the current conducted to the coil is reversed, and further, the repelling force in the description acts as the attractive force. Therefore, it is a configuration in which the swinging lever is operated by the attractive force or the repelling force of the permanent magnet generated by the conduction of electricity to the coil to drive the shutter blade.

In addition, although the magnet coil is wound around the iron core which is fixed so as to face inner sides of the permanent magnets of the ends of the both arm portions in the above-mentioned embodiments, it is possible to configure to face external sides of the permanent magnets of the ends of the both arm portions. That is, it is possible to configure to face even the external sides by forming the iron core in a U-shape.

It is to be understood that the invention is not limited to the above-mentioned embodiments, and appropriate changes can be made to the embodiment without departing from the scope of the present invention.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A camera shutter, comprising:
   a base plate having a shutter opening;
   a shutter blade for opening and closing the shutter opening; and
   a driving means for driving the shutter blade,
   wherein the driving means comprises a swingably journaled swinging lever having arm portions on both sides of a rotating shaft as well as a portion connected to the shutter blade, permanent magnets provided on both ends of the arm portions, a magnet coil wound around an iron core that is fixed so as to face the permanent magnets of the both ends, and an electromagnetic drive circuit for controlling electricity conduction to the magnet coil; and
   the swinging lever is operated by attractive force toward or repelling force against the permanent magnet that is generated by conduction of electricity to the magnet coil to drive the shutter blade.

2. The camera shutter according to claim 1, wherein the iron core having the magnet coil wound therearound faces inner sides of the permanent magnets of the both ends.

3. The camera shutter according to claim 1, wherein the swinging lever is operated while the permanent magnet is moved in a direction along a surface of the iron core, thereby driving the shutter blade.

* * * * *